United States Patent [19]

Stuart

[11] 4,355,397
[45] Oct. 19, 1982

[54] FULL DUPLEX COMMUNICATION SYSTEM FOR VOICE GRADE CHANNELS

[75] Inventor: Richard L. Stuart, Columbia, Md.

[73] Assignee: Rixon, Inc., Silver Spring, Md.

[21] Appl. No.: 197,038

[22] Filed: Oct. 15, 1980

[51] Int. Cl.³ .............................................. H04L 3/00
[52] U.S. Cl. .......................................... 375/17; 375/39; 370/20
[58] Field of Search ......................................... 375/7–9, 375/17–20, 38, 39, 41, 42, 43, 61; 455/46, 47, 60; 370/24, 30, 32

[56] References Cited

U.S. PATENT DOCUMENTS

| | | | |
|---|---|---|---|
| 3,732,495 | 5/1973 | McRae et al. | 455/60 |
| 3,760,277 | 9/1973 | Whang | 375/43 |
| 3,845,412 | 10/1974 | Rearwin | 375/43 |
| 3,937,882 | 2/1976 | Bingham | 375/10 |
| 4,101,833 | 7/1978 | Bingham et al. | 375/8 |
| 4,123,710 | 10/1978 | Stuart | 375/18 |
| 4,285,062 | 8/1981 | Yoshida | 375/20 |

*Primary Examiner*—Benedict V. Safourek
*Assistant Examiner*—Stephen Chin
*Attorney, Agent, or Firm*—Dale Gaudier

[57] ABSTRACT

A pair of full duplex modems (12, 14), each at one end of a two-wire voice grade telephone channel (16), simultaneously transmit synchronous data at high speeds in both directions. In each modem, the simultaneous transmission and reception are accomplished by frequency division. The high speed operation is obtained by odd/even bit stream division and full response binary to ternary level coding coupled with nine level quadrature amplitude modulation and correction framing techniques.

35 Claims, 14 Drawing Figures

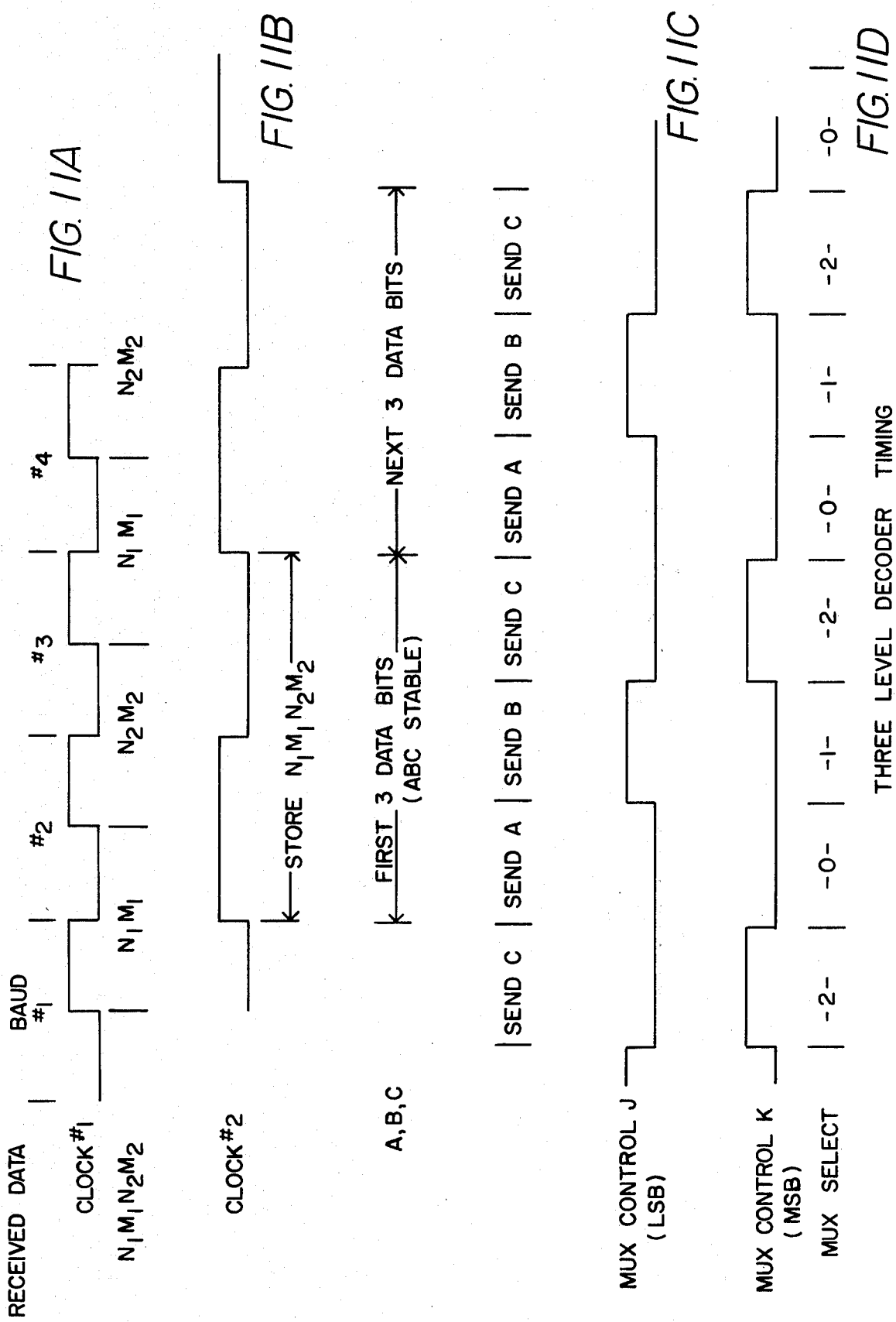

4,355,397

FULL DUPLEX COMMUNICATION SYSTEM FOR VOICE GRADE CHANNELS

TECHNICAL FIELD

The present invention relates generally to full duplex communication over two-wire lines and more particularly to such systems employing frequency division multiplexing with full response binary to ternary level coding in quadrature amplitude modulation to achieve a high bit rate, full duplex operation.

BACKGROUND ART

In the past, full duplex communication over two-wire lines has been achieved by the use of modems (*modulator-demodulators*) which use frequency division multiplexing in binary level asynchronous frequency shift keying to obtain full duplex transmission at data rates of 300 bits per second. A typical system is disclosed in U.S. Pat. No. 3,655,915.

For many years, full duplex transmission at data rates of 1,200 bits per second has become accepted in the industry. Such systems provide synchronous data transmission using double sideband, suppressed carrier, quadrature amplitude modulation. A typical system of this type is disclosed in U.S. Pat. No. 3,937,882. Other 1,200 bit per second modems have utilized frequency division coupled with four-level phase modulation of the carriers.

More recently, a method of transmitting 2,400 bits per second has come into use which employs frequency division in a complex amplitude and phase modulation scheme of 16 levels.

All these prior art systems have been relatively wasteful of bandwidth, relatively subject to noise interference, and/or relatively subject to phase jitter or distortion which limited the maximum transmission speed over a typical 3,000 Hz voice grade telephone channel.

DISCLOSURE OF INVENTION

The present invention provides a high speed, full duplex communication system for use over two-wire voice grade communication channels which has improved immunity to the various degradations encountered over such channels.

The present invention provides for increasing the information content in a given bandwidth, combined with the ability to discriminate signals. This is accomplished by using three levels of amplitude modulation combined with placing the carrier frequency in quadrature to form a space diagram having nine states in a three-by-three configuration to allow this modulation technique to be called three-by-three quadrature amplitude modulation.

The present invention further provides higher peak transmission levels for a given average carrier level, and thus a concomitant advantage in performance for a given average signal to noise ratio, through the use of a zero ternary state for both carriers as an information signal.

The present invention further provides for checking to determine whether proper framing of the characters has been achieved by the reciever and modifying the decoding to correct incorrect framing. This is accomplished by using one of the nine possible combinations of signal levels to indicate framing.

The present invention further provides a system by which the decisive circuitry is modified to increase immunity to phase jitter by increasing the decision regions.

The invention still further provides a method by which a tone may be transmitted between transmitting and receiving channels to provide the spectral characteristics required by the telephone equipment to prevent inadvertent operation of telephone company equipment.

The present invention still further provides a fall back mode of operation in which the normal operation in excess of 2,400 bits per second may be dropped to 1,200 bits per second through the use of a differential phase modulation technique in the event that a severely degradated voice channel is obtained.

Other features and advantages of the invention will be set forth or will be apparent from a detailed description of a preferred embodiment found herein.

BRIEF DESCRIPTION OF DRAWINGS

FIG. 11*a*–11*d* are timing diagrams of the decoding circuitry shown in FIG. 5. de

BEST MODE FOR CARRYING OUT THE INVENTION

Figure 1:
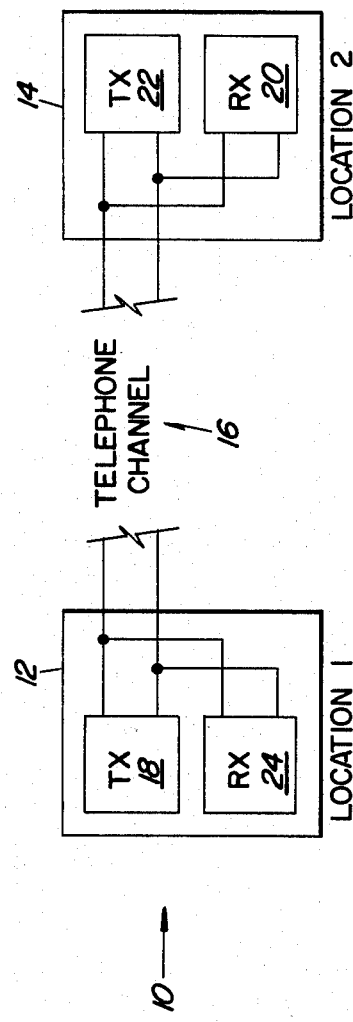
FIG. 1 is a simplified block diagram of a full duplex communication system incorporating the features of the present invention.

Referring now to FIG. 1, therein is shown a full duplex communication system 10 for communication over a two-wire voice grade telephone line and incorporating the features of the present invention. The communication system 10 includes a modem 12 transmitting to and receiving from the modem 14 high speed data signals over a telephone channel designated by the numeral 16.

The modem 12 contains a transmitter section 18 which transmits to a receiver section 20 in the modem 14. Similarly, the modem 14 contains a transmitter section 22 which transmits to a receiver section 24 in the modem 12. The modem 12 is at a first location and the modem 14 is at a remote second location. While it would be obvious to those skilled in the art that the present invention may be operated at speeds higher than 2,400 bits per second in both directions, the following description will reference this speed for ease of description with no intention to be limited thereby.

Figure 2:
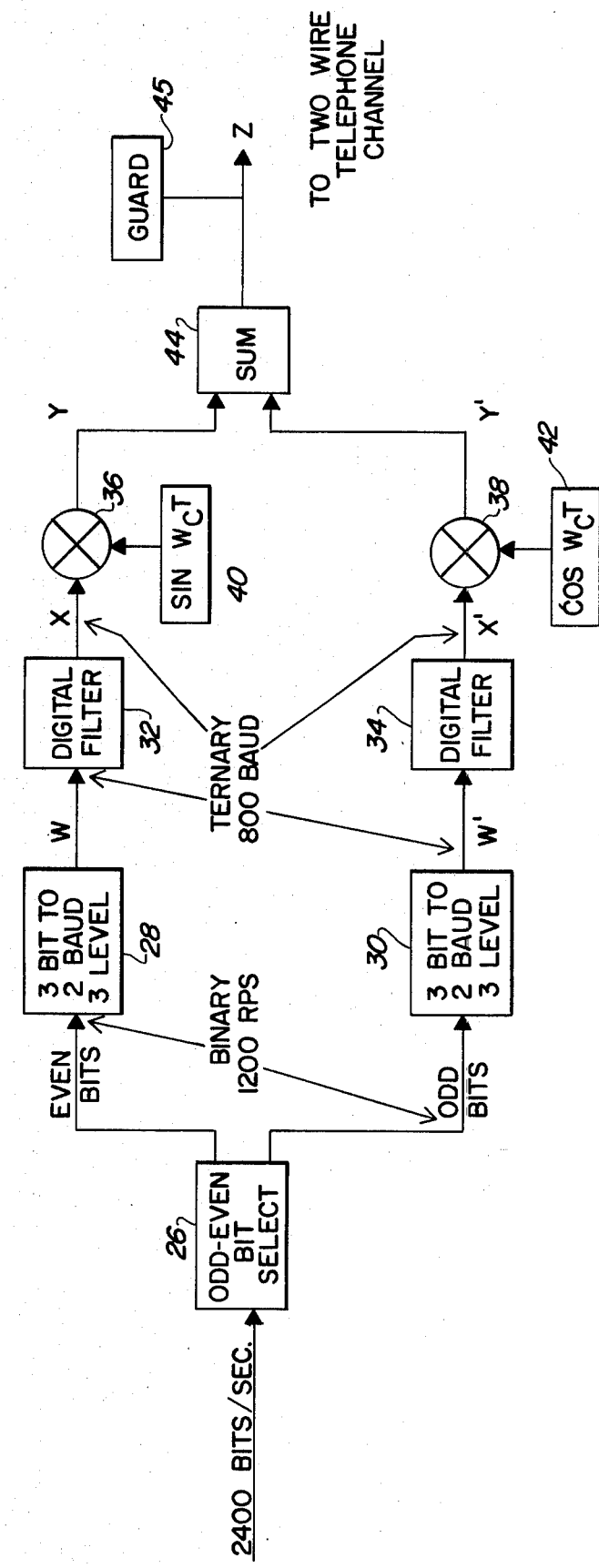
FIG. 2 is a block diagram of each duplex transmitter section of the system shown in FIG. 1.

Referring now to FIG. 2, therein is shown a transmitter section 18 having an odd/even bit selector 26 which is provided with a 2,400 bit per second data signal from a digital computer (not shown). The odd/even bit selector 26 provides even bits to a first three bit two level to two baud three-level encoder 28 and odd bits to a second three bit two level to two baud-level encoder 30. Both of these encoders are the same and will be described in more detail later.

The two baud three-level signals, designated by W and W' in FIG. 2, are respectively provided to conventional digital filters 32 and 34 which are of the type described in U.S. Pat. Nos. 3,825,834, 3,883,727 and 3,946,214.

The filtered two baud three-level signals, designated by X and X', modulate carrier signals in modulators 36 and 38 respectively that are respectively supplied by carrier signals which are in quadrature from carrier generators 40 and 42. Carrier generators 40 and 42 respectively provide SIN WcT and COS WcT carrier signals. The modulated carrier signals, designated by Y and Y' in FIG. 2, are provided to a summer 44 which combines the signals to provide an output, designated as Z in FIG. 2, which is a three-by-three quadrature amplitude modulated signal.

Figure 3:
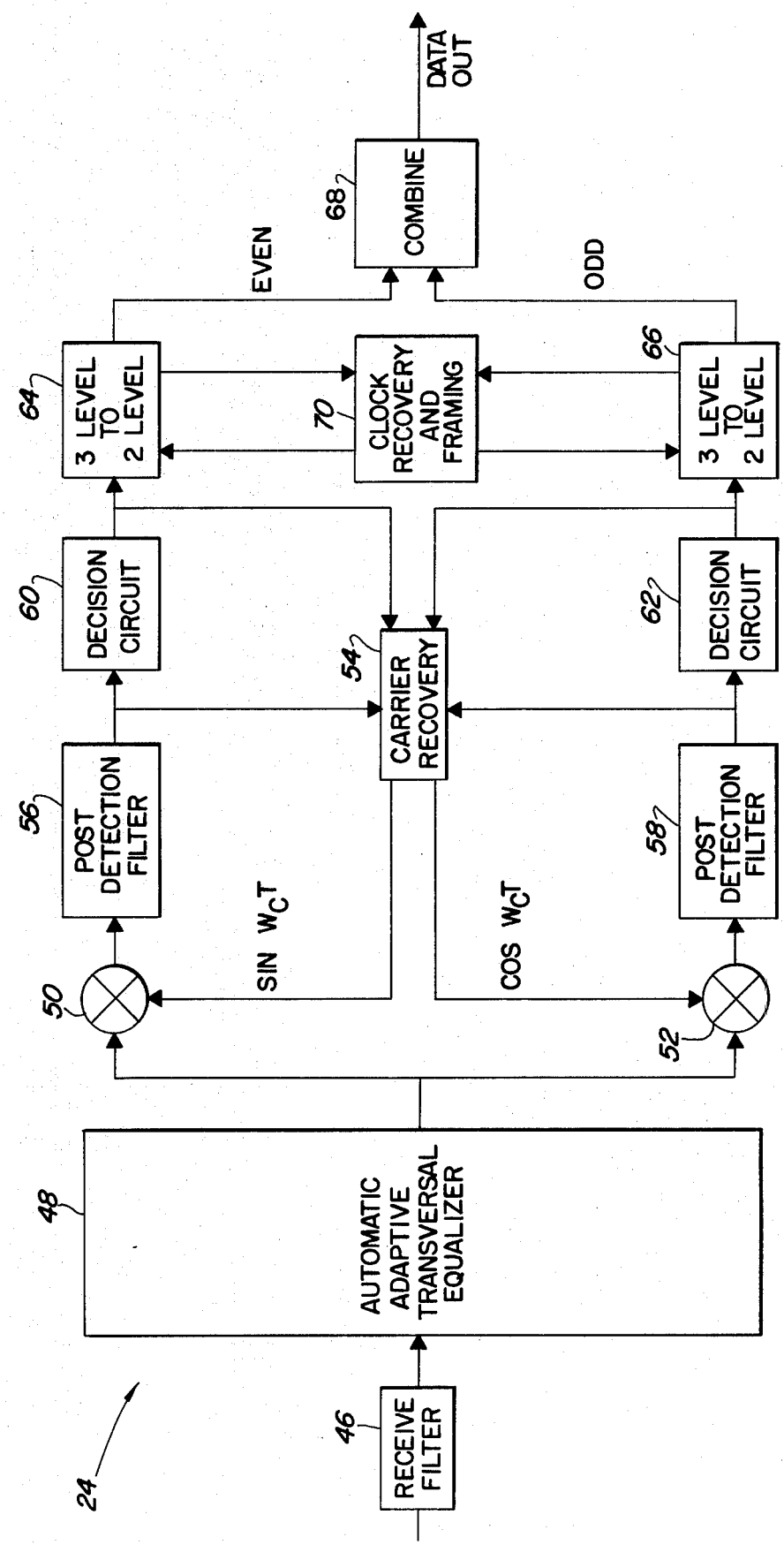
FIG. 3 is a block diagram of each duplex receiver section of the system shown in FIG. 1.

Referring now to FIG. 3, therein is shown a receiver section 24 which receives signals from the transmitter section 22. As is well known in the art, the transmitting and receiving signals are properly frequency divided such that signals from transmitter section 18 are different from those transmitted from the transmitter section 22, causing the receiver section of the corresponding modem to receive signals at a frequency different from the transmitting frequency. A typical example of this type of circuitry is shown in U.S. Pat. No. 3,937,882.

The receiver section 24 receives the three-by-three quadrature amplitude modulated signal at a receive filter 46 which filters out those signals that are not related to the carrier frequency being transmitted from the transmitter section 22. The filtered output from the filter 46 is provided to an automatic adaptive transversal equalizer 48 of a type described in U.S. Pat. No. 3,931,604 which equalizes the non-linear characteristics of the telephone channel 16. The output of the automatic equalizer 48 is provided to demodulators 50 and 52 for multiplication respectively by SIN WcT and COS WcT signals from conventional carrier recovery circuitry 54.

The outputs of the modulators 50 and 52 are respectively provided to post detection filters 56 and 58 from which signals are derived to be applied to the carrier recovery circuitry 54. The outputs of the post detection filters 56 and 58 are further provided to decision circuitry 60 and 62 which will be described in greater detail later. The decision circuitry 60 and 62 receive the transmitted signal and modify it to provide two baud three level signals from which the carrier is recovered by processing in carrier recovery circuitry 54. Each of the signals is further provided respectively to two baud three level-to-three bit two level decoders 64 and 66 which will be described in greater detail later. The outputs of the encoder 64 and 66 are respectively representative of the even and odd bits and are sent to the combiner 68 which provides the 2,400 bit per second output to a second computer (not shown). The signals representative of the odd and even bits are provided to clock recovery circuitry 70 which provides an output clocking signal.

Figure 4:
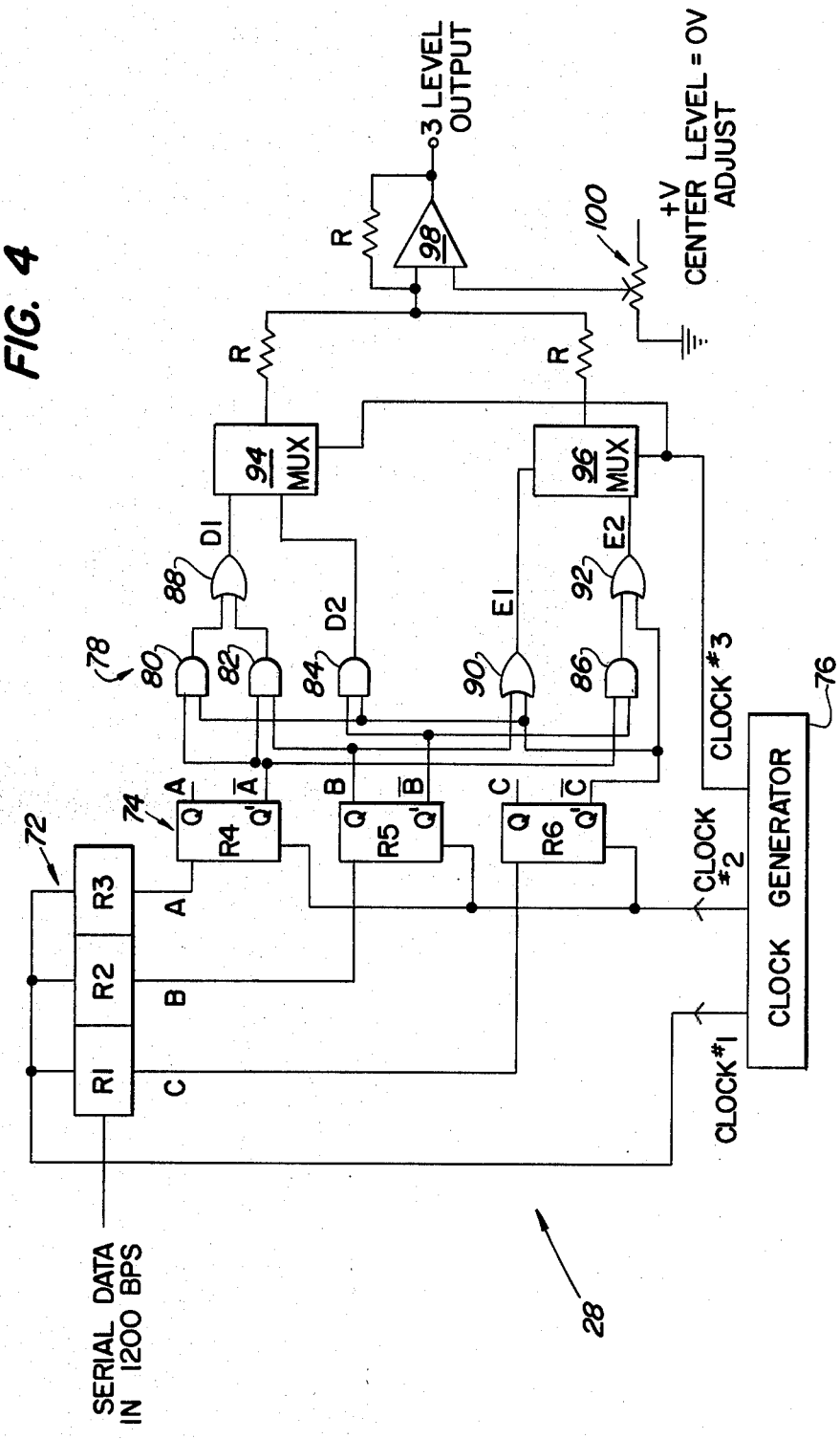
FIG. 4 is a circuit diagram of a three bit two level to two baud three level encoder in accordance with the invention.

Referring now to FIG. 4, therein is shown in detail the three bit two level to two baud three level encoder 28 of FIG. 2. It should be noted that 28 and 30 are identical. Within the encoder 28, serial data are applied to cascaded registers 72 which are individually designated as R1, R2 and R3. The registers R1, R2 and R3 respectively supply signals C, B and A to flip-flop registers 74 designated respectively R6, R5 and R4. The cascaded registers 72 are clocked by clock pulses from a clock generator 76. The clock generator 76 also provides clock signals to the flip-flop register 74 to cause them to supply signals at their respective Q or Q' outputs to logic circuitry 78. The logic circuitry 78 comprises conventional AND gates 80, 82, 84 and 86, and conventional OR gates 88, 90 and 92. The Q' output of register R4 is connected to one of the inputs of AND gates 80, 82 and 86. The Q output of register R5 is connected to the other input of the AND gate 82 and one input of the OR gate 90 while the Q' output of the register R5 connected to one of the inputs of the AND gate 84 and the other input of the AND gate 86. The Q' output of the register R6 is connected to the other inputs of the AND gates 80 and 84 and to the other inputs of the OR gates 90 and 92. The Q outputs of registers R4 and R6 are unused. The outputs of AND gates 80 and 82 are provided as inputs to the OR gate 88 while the output of the AND gate 86 is provided as the other input to the OR gate 92.

The output signal of the logic circuitry 78 includes signals D1, D2, E1 and E2 respectively from the OR gate 88, the AND gate 84, the OR gate 90 and the OR gate 92. The D1 and D2 signals are supplied to conventional multiplexer 94 while the E1 and E2 outputs are provided to another conventional multiplexer 96. The multiplexers 94 and 96 are clocked by signals from the clock generator 76 to provide outputs which are summed and then applied to an operational amplifier 98 having an adjustment 100 for adjusting the center level of its output signal.

Figure 5:
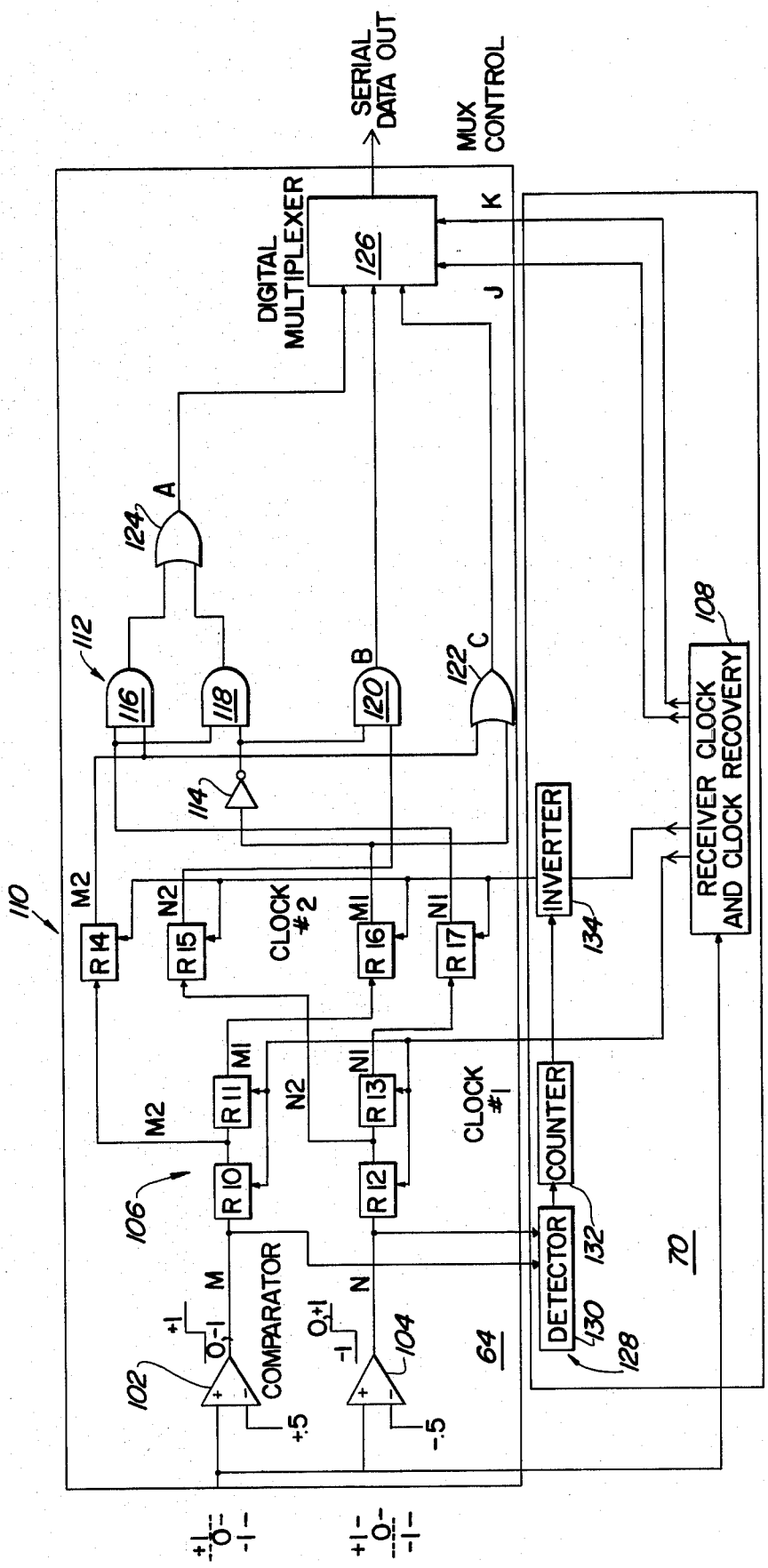
FIG. 5 is a circuit diagram of a three level to two level decoder, in accordance with the invention.

Referring now to FIG. 5, the two baud three level to three bit two level decoder 64, which can simply be referred to as a three-to-two level decoder is shown in detail. The three level signal from the decision circuit 60 is applied to two comparators 102 and 104. The other inputs of the comparators 102 and 104 are respectively connected to references at +0.5 volt and −0.5 volt. The output of the comparators 102 and 104 are signals designated M and N. The signals M and N are provided to storage registers 106 which comprise registers R10, R11, R12 and R13. The storage registers 106 are all clocked by receiver clock and clock recovery circuitry 108. This clock circuitry 108 is synchronized to the input of the three to two level decoder 64 and may be of a conventional type similar to that described in U.S. Pat. No. 3,746,800.

The storage registers 106 provide inputs to holding registers 110 which comprise registers R14, R15, R16 and R17 that are all clocked by a second clock signal from the clock circuitry 108.

The various storage and holding registers are interconnected with register R10 providing a signal M1 for registers R14 and R11. Register R11 provides a signal M2 to register R16. Register R12 provides a signal N2 to registers R15 and R13. The register R13 provides a signal N1 to register R17.

Holding registers R14 to R17 provide outputs to logic circuitry 112 which comprises an inverter 114, AND gates 116, 118 and 120, and OR gates 124 and 122. The register R16 provides a signal M1 to the inverter 114 which has an output connected to the inputs of AND gates 118 and 120. The signal M1 is further provided to the OR gate 122. The register R17 provides a signal N1 to the inputs of AND gates 116 and 118. The register R14 provides a signal M2 to the inputs of AND gate 116 and the OR gate 122. The register R15 provides a signal N2 to the input of the AND gate 120. The outputs of AND gates 116 and 118 are applied to the inputs of the OR gate 124. Thus, the output of the logic circuitry 112 will be signals A, B and C generated respectively by OR gate 124, AND gate 120 and OR gate 122.

The signals A, B and C are provided to the digital multiplexer 126 which operates under control signals J and K from the clock circuitry 108 to sequentially output the two level signals as binary serial data.

The clock circuitry 108 is part of the clock recovery and framing circuitry 70. The remaining portion of this circuitry (the framing circuitry) is generally designated by the numeral 128. The framing circuitry 128 includes detector circuitry 130 which senses the presence of a preselected ternary level signal to provide an output to a counter 132. When the counter 132 has received a predetermined number of input signals, it will supply a signal to an inverter 134 which inverts the clock number. Thereafter, the counter 132 is reset by a signal on reset line R.

In describing the operation, it should be noted that the numerical values provided herein are intended to be only illustrative and are not to be limiting.

Figure 6:
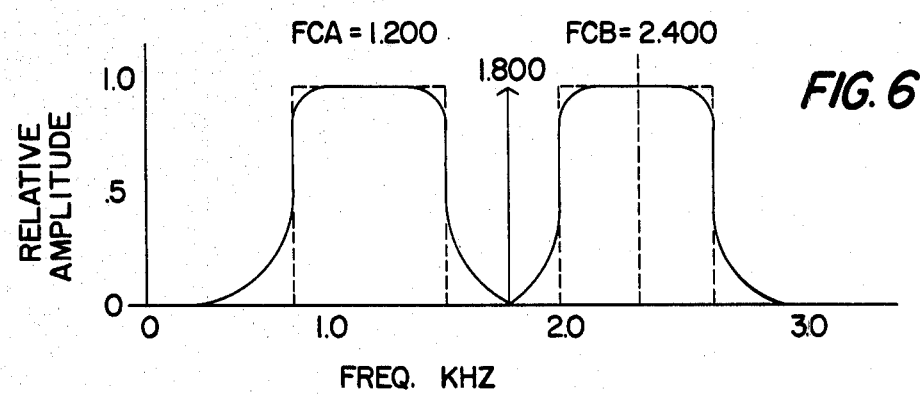
FIG. 6 is a diagram of a frequency spectrum of signals developed by the system of FIG. 1 on a telephone channel.

In operation the transmitter section 18 of the modem 12, shown in FIG. 1, generates a 1,200 Hz modulated carrier. This modulated carrier is applied to the telephone channel 16 and is sent to the modem 14. In the modem 14, the receive filter 46, shown in FIG. 3, of the receiver 20 rejects all frequencies except those of the transmitter 18. Simultaneously, the transmitter section of the modem 14 generates a 2,400 Hz modulated carrier. This modulated carrier is applied to the telephone channel 16 and is filtered by a selective filter in the receiver 24 which rejects all frequencies except those of the transmitter section 22. Thus, the frequency sepctrum of signals on the telephone channel 16 appears as shown in FIG. 6. As previously mentioned, the method by which the transmitter sections and the receiver sections operate at the correct frequencies is well known.

With the understanding that the transmitter section 18 and its related receiver section 20 are illustrative of one half of the full duplex operation, it can be seen from FIG. 2 that input binary data are provided from a computer to the odd/even bit selector 26. For a 2,400 BPS input, two 1,200 BPS streams will be derived with one stream representing the even bits and the other the odd bits.

Figure 7:
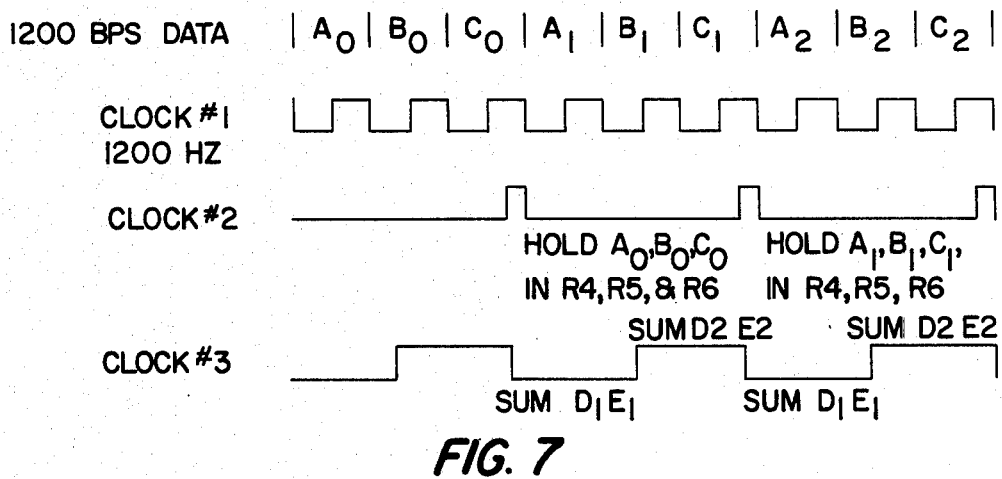
FIG. 7 is a diagram showing the timing of the encoding circuitry of FIG. 4.

The three bit two level to two baud three level encoder in FIG. 4 accepts the serial data at 1,200 BPS into the cascaded registers 72 at a 1,200 Hz rate according to the clock #1 as shown in FIG. 7. After the three bits are clocked into the three registers R1, R2 and R3, a second clock signal clock #2 activates the flip-flop registers 74 to cause the contents of registers R1, R2 and R3 to respectively shift into registers R6, R5 and R4 where they provide output signals to the logic circuitry 78 while three new bits are being entered into the cascaded register 72.

Figure 8:
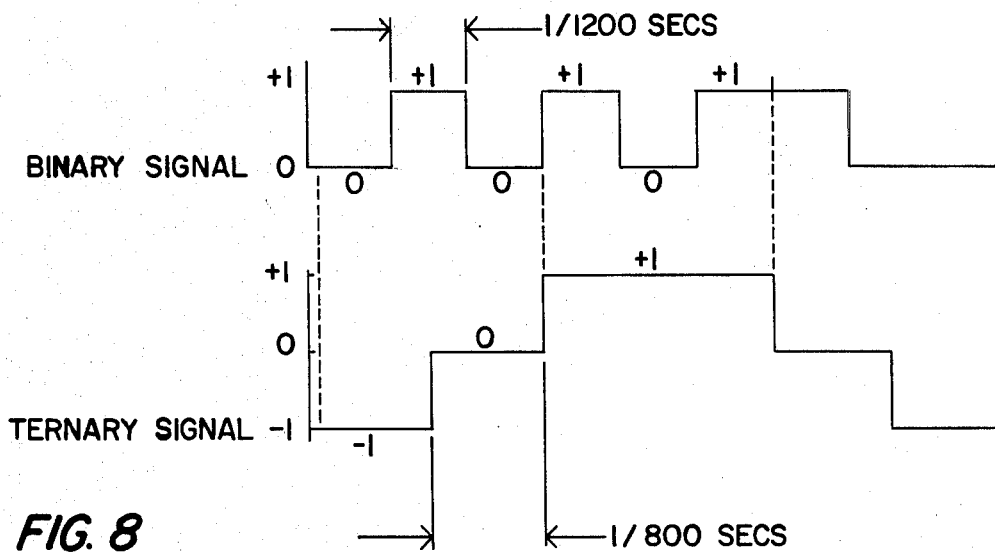
FIG. 8 is a diagram showing a binary signal and corresponding ternary signal.

The logic circuitry 78 provides outputs such that the D1 and E1 signals together form the first character on baud of the two baud three level signal, as shown in FIG. 8, while the D2 and E2 signals form the second baud. The multiplexers 94 and 96 as clocked by the clock #3 assure that the D1, E1 signals are transmitted together to the operational amplifier 98 and that the D2, E2 signals are subsequently provided to the operational amplifier 98 where the center level of the full response output is provided.

For purposes of clarification, considering the possible conditions for D1 and E1 and assuming that the logic levels of the signals are 1 and 0 for logical 1 and 0, respectively, the output of the operational amplifier 98, without the center level adjusted, is as shown in the first column of Table I.

TABLE I

| D1 | E1 | Unadjusted Operational Amp. Output | Adjusted Operational Amp. Output |
|---|---|---|---|
| 0 | 0 | 0 volt | +1 volt |
| 0 | 1 | −1 volt | 0 volt |
| 1 | 0 | −1 volt | 0 volt |
| 1 | 1 | −2 volts | −1 volt |

With the center level adjusted, it will be noted that three levels are possible, viz., −1, 0 and +1 levels. Thus, if the input serial bits to the cascaded registers 72 are 0, 1, 0, the processed output signals D1 and E1 are respectively 0, 1 and the D2 and E2 signals are 1, 0 to the multiplexers 94 and 96. Under clocking by the clock #3, the multiplexers 94 and 96 provide outputs such that the output of the operational amplifier 98 is −1 during the first baud interval and 0 during the second. This binary to ternary signal encoding is shown as the first signal interval in FIG. 8.

Referring back to FIG. 2, it will be seen that the three bit two level to two baud three level encoders transform the 1,200 BPS binary stream into an 800 baud rate ternary stream. Since the three level changes can occur 800 times per second, the signals can be transmitted properly if the bandwidth of the system is limited to no less than 400 Hz by the digital filter 32. Thus the signals W and W', which have very sharp rising and trailing edges, are filtered to X and X' with comparatively rounded leading and trailing edges.

The band limited signals X and X' which occupy the frequency range from d.c. to somewhat above 400 Hz are supplied to the multipliers 36 and 38. In the multipliers 36, 38, the X and X' signals modulate carrier signals respectively provided by the carrier generators 40 and 42. The carriers 40 and 42 respectively provide sinWcT and cosWcT inputs where the radian frequency is Wc. Thus, the outputs Y and Y' of the multipliers 36 and 38 are translated up to extend ±400 Hz on either side of the carrier which is 1,200 Hz in the present example. The difference between the two signals Y and Y' is that the signal Y, which is called the in-phase signal, is 90° out of phase with Y', which is called the out-of-phase signal. This quadrature phasing of the two signals allows each of the two signals to be modulated independently.

The signals from the multipliers 36 and 38 are summed in the summer 44 and outputed as the signal Z. Since each of the modulated carrier signals has three levels providing a total of nine signal states as represented by the nine dots in the state space diagram shown in FIG. 9, the present modulated technique can be called 3 and 3 quadrature amplitude modulation, or 3×3 QAM.

Figure 9:
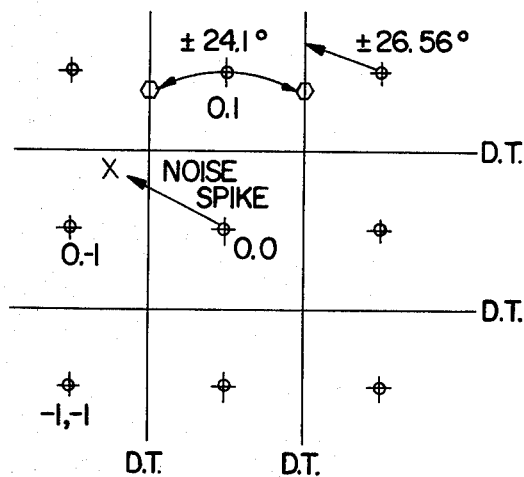
FIG. 9 is a state space diagram showing the nine possible coordinates of bauds formed by two ternary levels.

It should be noted that the zero ternary state is the off condition of the carrier, and when both carriers have this state, the center dot of FIG. 9 occurs. One advantage of 3×3 QAM is that the off state of the carrier is used to send information and this allows higher peak transmission levels for a given average carrier level. This higher peak transmission level leads to an advantage in performance for a given average signal-to-noise ratio. Statistically, using the carrier off state as a signalling state allows a 14% higher peak power for a given average power which leads to a significant signal-to-noise advantage.

It should also be noted from inspection of FIG. 6 that the carrier frequencies as well as the bandwidth filtering lead to a frequency spectrum which is ideal for injecting a power guarding tone as required by European Telephone Company specifications. Thus, guard circuitry 45 is provided to inject the desired tone. The circuitry and technique have long been known and would be obvious to those skilled in the art by reference to the recent U.S. Pat. No. 4,101,833.

Upon transmission across the telephone channel 16, the signal will be subject to various degradations which include phase jitter, noise and nonlinear response. At the receiver section 20, shown in FIG. 3, the signal is received at the receive filter 46 which filters out noise as well as signals from the transmitter section 22 to provide a filtered signal to the automatic adaptive transversal equalizer 48. The automatic adaptive transversal equalizer 48 is so well known in the art that its operation need not be described. The output of the equalizer 48 is a signal Z which generally corresponds to the signal Z generated by the transmitter section 18. The signal Z is applied to the two multipliers 50 and 52 where the signal is multiplied by sinWcT and cosWcT from the carrier recovery circuitry 54 that is responsive to the outputs of the post detection filters 56 and 58 and the decision circuits 60 and 62. The outputs of the multipliers 50 and 52 are representative of the even and odd bits, respectively, of the serial binary data.

The outputs of the multipliers 50 and 52 are supplied to the post detection filters 56 and 58 which remove the carrier related components. The outputs of the filters 56 and 58 generally resemble the waveform labeled ACTUAL in FIG. 10 which represents the IDEAL waveform after band limiting and degradation by noise.

Figure 10:
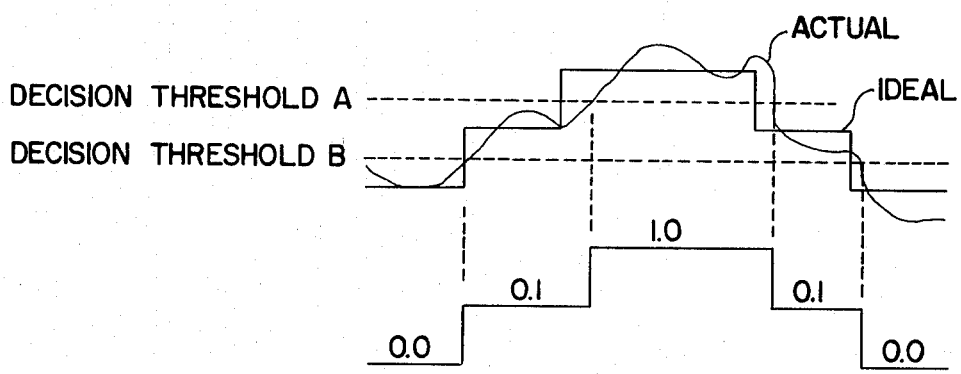
FIG. 10 is a decision threshold diagram developed by circuitry including in the receiver section shown in FIG. 8.

To obtain useful information from the ACTUAL waveform, the outputs of the filters 56 and 58 are respectively provided to the decision circuits 60 and 62. In each of the decision circuits, there is provided circuitry to determine the decision thresholds A and B as shown in FIG. 10 by which the actual level of the signal may be determined. Referring to FIG. 9, the four decision thresholds designated by the DT of decision circuits 60 and 62 form a grid like pattern in which the four corner signals may be subject to ±24.29 degrees of phase jitter before an erroneous reading will occur while the other signals must have ±30 degrees of phase jitter. In FIG. 10, the corresponding decision circuit output to the signal above is shown below. This decision circuit output is not necessarily a three level signal but can be two binary outputs coded 0, 0 or 0, 1 or 1, 0. The three level output is shown only to indicate input-output relationships of the decision circuits 60 and 62.

The outputs of the decision circuits 60 and 62 in addition to being used for carrier recovery are provided to the three to two level decoders 64 and 66.

With the understanding that the decoder 64 for the in-phase signal is typical, the demodulated two baud three level signal is applied to the comparators 102 and 104. The comparator 102 has its other input set to +0.5 volt; thus a +1 level of the three level input will cause the output M to be a logical 1 while a 0 or −1 input will cause the output M to be a logical 0. In the comparator 104, the second input is a −0.5 volt reference; thus a 0 or +1 input will cause the comparator to generate an output N of a logical 1 while a −1 input will cause the output N to be a logical 0.

The output of comparator 102 is stored in storage registers 106 which are designated R10 and R11 while the outputs of comparator 104 are stored in the storage registers designated R12 and R13. The registers R10, R11, R12 and R13 store the outputs for two bauds under clocking from the receiver clock and clock recovery circuitry 108 which derives its clock from the demodulated three level signal and provides an output as indicated in FIG. 11(a).

The signals stored in storage registers 106 are then successively transferred to the holding registers 110 and held therein until clocked by the clock signal #2 as shown in FIG. 11(b) for two full bauds.

The output of the comparator 102 is a signal designated by M which has a first logical value M1 during the first baud and a second logical value M2 during the second baud. Similarly, the comparator 104 has an output signal N which has a first logical value N1 during the first baud and a second logical value N2 during the second baud.

With the first clock #1 signal, M1 and N1 are stored in registers R10 and R12. With the application of the second clock #1 signal, the M2 and N2 values are entered in registers R10 and R12 and the M1 and N1 values are registered, respectively, in registers R11 and R13. Upon clocking by the clock signal #2, the four logical values are held in registers R14 through R17 as shown in FIG. 2. The contents of the holding registers 110 are processed by the logic circuitry 112 to provide three simultaneous output signals A, B and C which are serially generated under the control of the multiplexer (MUX) control signals J and K shown in FIGS. 11(c) and 11(d).

For example, if the two baud three level signal is a −1 followed by a 0, the comparator outputs for M1 and M2 would be 0 and 0, while the N1 and N2 signals would be 0 and 1 respectively. This would result in the logic circuitry 112 processing register 14 through 17 output signals of 0, 1, 0 and 0 to provide A, B and C signals of 0, 1, 0. The digital multiplexer 126 would thus generate the three bit two level output 0, 1, 0.

Referring to FIG. 9, it will be noted that there are 9 possible coordinates of bauds formed by two ternary levels. Since there are 8 possible combinations of three bits, there will be one combination of two ternary level signals which would not be used when transmitting data using three binary bits. Using one possible combination of binary to ternary conversion as shown in the Table II below, it will be seen that +1 and −1 in combination could be used to accomplish other operations:

TABLE II

| Three Binary Bits | Two Ternary Levels |
| --- | --- |
| 000 | −1 −1 |
| 001 | +1  0 |
| 011 | −1 +1 |
| 010 | −1  0 |
| 110 |  0  0 |
| 111 |  0 +1 |
| 101 | +1 +1 |
| 100 |  0 −1 |

The framing circuitry 70 operates to reduce the error by detecting the ternary character +1, −1 in combination in the detector 130 and when this occurs a predetermined number of times as counted in counter 132, a signal is provided to the inverter 134 to cause a phase change in the clock #2 signal to group the next two ternary levels for decoding rather than continuing with the incorrect framing. This improves impulse noise immunity of the communication system against noise spikes of the type shown in FIG. 9.

After the serial binary signals are generated by the three to two level decoders 64 and 66, they are provided to an odd/even combiner 68 which recombines the even and odd bits to provide the 2,400 bit per second serial data output.

Thus, there has been described herein a full duplex communication system for voice grade channels. As many possible embodiments including increased digital implementation may be made of the present invention without departing from the scope thereof, it is to be understood that all matters set forth herein or shown in the accompanying drawings is to be interpreted in an illustrative and not a limiting sense.

I claim:

1. Apparatus for modulating and demodulating a signal comprising:
    transmitter means comprising:
        means for splitting a series of input binary data bits into an even bit stream and an odd bit stream;
        means for converting said binary data bit streams into respective streams of multi-level encoded data characters;
        means for modulating one of said multi-level encoded data character streams by an in-phase carrier signal;
        means for modulating the other said multi-level encoded data character stream by a quadrature carrier signal; and
        means for summing said modulated carrier signals to produce a multi-level quadrature amplitude modulated output signal; and
    receiver means comprising:
        means for splitting a received multi-level quadrature amplitude modulated signal into n-phase and quadrature components;
        means for demodulating said in-phase and quadrature signal components to produce first and second streams of multi-level encoded data characters;
        means for decoding said first and second streams of multi-level characters into respective streams of binary data bits; and
        means for combining said binary data bit streams to produce an output data bit stream representative of the information borne by said multi-level quadrature amplitude modulated signal.

2. The apparatus of claim 1 wherein said converter means comprises means for converting a group of N binary digits into two band N-level encoded characters and wherein said decoder means comprises means for converting said two band N-level encoded characters into groups of N binary digits.

3. The apparatus of claim 2 wherein N=3.

4. The apparatus of claim 1 wherein said modulator means comprises means for generating an in-phase carrier signal and a quadrature carrier signal, means for multiplying one of said multi-level encoded character streams by said in-phase carrier signal, and means for multiplying the other said multi-level encoded character stream by said quadrature carrier signal.

5. The apparatus of claim 1 further including means for limiting the bandwidth of the outputs of said converter means.

6. The apparatus of claim 1 further including means for equalizing said in-phase and quadrature components of the received signal before being demodulated.

7. The apparatus of claim 6 wherein said equalizing means is an automatic adaptive transversal equalizer.

8. The apparatus of claim 1 wherein said demodulator means comprises means for generating in-phase and quadrature demodulator signals, means for multiplying said in-phase received signal by said in-phase demodulator signal, and means for multiplying said quadrature received signal by said quadrature demodulator signal.

9. The apparatus of claim 1 further including means for filtering carrier related components from the outputs of said demodulator means.

10. The apparatus of claim 1 further including means responsive to the outputs of said demodulator means for determining the levels of said demodulated multi-level encoded signals and for outputting a signal indicative thereof to said decoder means.

11. A full response QAM modulator and demodulator system comprising:
    transmitter means comprising:
        means for splitting a series of input binary data bits into two data bit streams;
        means for converting said binary data bit streams into respective streams of ternary level encoded data characters;
        means for modulating one of said ternary level encoded data character streams by an in-phase carrier signal;
        means for modulating the other said ternary level encoded data character stream by a quadrature carrier signal; and
        means for summing said modulated carrier signals to produce a 3×3 QAM output signal; and
    receiver means comprising:
        means for splitting a received 3×3 QAM signal into in-phase and quadrature components;
        means for demodulating said in-phase and quadrature signal components to produce first and second streams of ternary encoded data characters;
        means for decoding said first and second streams of demodulated ternary data characters into respective streams of binary data bits; and
        means for combining said binary data bit streams to produce an output data bit stream representative of the information borne by said 3×3 QAM signal.

12. The apparatus of claim 11 wherein said binary data bits of said transmitter means are split into a stream of even bits and a stream of odd bits.

13. The apparatus of claim 11 wherein said converter means comprises means for converting serial groups of three binary bits into two band ternary level encoded characters and wherein said decoder means comprises means for converting serial groups of two band ternary level encoded characters into groups of three binary digits.

14. The apparatus of claim 13 wherein one of said two band ternary level encoded data characters is used as a framing character.

15. The apparatus of claim 11 wherein said modulator means comprises means for generating an in-phase carrier signal and a quadrature carrier signal, means for multiplying one of said ternary encoded character streams by said in-phase carrier signal, and means for multiplying the other said ternary encoded character stream by said quadrature carrier signal.

16. The apparatus of claim 11 further including means for limiting the bandwidth of the outputs of said converter means.

17. The apparatus of claim 11 further including means for equalizing said in-phase and quadrature components of the received signal before being demodulated.

18. The apparatus of claim 17 wherein said equalizing means is an automatic adaptive transversal equalizer.

19. The apparatus of claim 11 wherein said demodulator means comprises means for generating in-phase and quadrature demodulator signals, means for multiplying said in-phase received signal by said in-phase demodulator signal, and means for multiplying said quadrature received signal by said quadrature demodulator signal.

20. The apparatus of claim 11 further including means for filtering carrier related components from the outputs of said demodulator means.

21. The apparatus of claim 11 further including means responsive to the outputs of said demodulator means for determining the levels of said demodulated ternary level encoded characters and for outputting a signal indicative thereof to said decoder means.

22. The apparatus of claim 11 further including means for duplexing said transmitted and received QAM signals along a two-wire line.

23. The apparatus of either claim 11 or claim 22 wherein a $3 \times 3$ QAM signal is transmitted at a frequency $f_1$ and received at a frequency $f_2$, the frequencies $f_1$ and $f_2$ being so separated and each said signal having a bandwidth such that the sidebands of said transmitted and received signals do not overlap, the apparatus further including means for injecting a guard tone between said sidebands.

24. A method of modulating and demodulating an information bearing signal,
the method of modulating the signal comprising the steps of:
splitting a series of input binary data bits into two data bit streams;
converting said binary data bit streams into respective streams of ternary level encoded data characters;
modulating one of said ternary level encoded data character streams by an in-phase carrier signal;
modulating the other said ternary level encoded data character stream by a quadrature carrier signal; and
summing said modulated carrier signals to produce a $3 \times 3$ QAM output signal; and
the method of demodulating the signal comprising the steps of:
splitting a received $3 \times 3$ QAM signal into in-phase and quadrature components,
demodulating said in-phase and quadrature signal components to produce first and second streams of ternary encoded data characters;
decoding said first and second streams of demodulated ternary data characters into respective streams of binary data bits; and
combining said binary data bit streams to produce an output data bit stream representative of the information borne by said $3 \times 3$ QAM signal.

25. The method of claim 24 wherein said input binary data bits are split into a stream of even bits and a stream of odd bits.

26. The method of claim 25 wherein said conversion step comprises converting serial groups of three binary bits into two band ternary level encoded characters and wherein said decoding step comprises converting serial groups of two band ternary level encoded characters into groups of three binary digits.

27. The method of claim 26 wherein one of said two band ternary level encoded data characters is used as a framing character.

28. The method of claim 24 wherein said modulation steps comprise the steps of generating an in-phase carrier signal and a quadrature carrier signal, multiplying one of said ternary encoded character streams by said in-phase carrier signal, and multiplying the other said ternary encoded character stream by said quadrature carrier signal.

29. The method of claim 24 further including the step of limiting the bandwidth of said ternary encoded data characters.

30. The method of claim 24 further including the steps of equalizing said in-phase and quadrature components of the received signal before being demodulated.

31. The method of claim 24 wherein said demodulation step comprises the steps of generating in-phase and quadrature demodulator signals, multiplying said in-phase received signal by said in-phase demodulator signal, and multiplying said quadrature received signal by said quadrature demodulator signal.

32. The method of claim 24 further including the step of filtering carrier related components from the demodulated output signals.

33. The method of claim 24 further including the step of duplexing said transmitted and received QAM signals along a two-wire line.

34. The method of either claim 24 or 33 wherein a $3 \times 3$ QAM signal is transmitted at a frequency $f_1$ and received at a frequency of $f_2$, the frequencies $f_1$ and $f_2$ being so separated and each said signal having a bandwidth such that the sidebands of said transmitted and received signals do not overlap.

35. The method of claim 34 further including the step of injecting a guard tone between said sidebands.

* * * * *

UNITED STATES PATENT AND TRADEMARK OFFICE
CERTIFICATE OF CORRECTION

PATENT NO. : 4,355,397

DATED : October 19, 1982

INVENTOR(S) : Richard L. Stuart

It is certified that error appears in the above-identified patent and that said Letters Patent are hereby corrected as shown below:

Column 2, line 44, "including" should read -- included --.

Column 2, line 47, delete "de".

Column 3, line 9, "baud-level" should read -- baud three-level --.

Column 3, line 64, "encoder" should read -- encoders --.

Column 4, line 13, "register" should read -- registers --.

Column 4, line 22, insert -- is -- between "R5" and "connected".

Column 4, line 64, "M1" should read -- M2 --.

Column 4, line 66, "M2" should read -- M1 --.

Column 5, lines 46 and 47, "sepctrum" should read -- spectrum --.

Column 6, line 4, "on" should read -- or --.

Column 7, line 3, "and" should read -- by --.

Column 8, line 44, "FIG. 2" should read -- FIG. 5 --.

In the Drawing Figures:

Fig. 2, "BINARY 1200 RPS" should read -- BINARY 1200 BPS --.

UNITED STATES PATENT AND TRADEMARK OFFICE
CERTIFICATE OF CORRECTION

PATENT NO. : 4,355,397
DATED : October 19, 1982
INVENTOR(S) : Richard L. Stuart

It is certified that error appears in the above-identified patent and that said Letters Patent are hereby corrected as shown below:

Claim 1, column 9, line 56, "n-phase" should read -- in-phase --.

Claim 2, column 10, lines 3 and 5, "band" should read -- baud --.

Claim 13, column 11, lines 3 and 5, "band" should read -- baud --.

Claim 14, column 11, line 9, "band" should read -- baud --.

Claim 26, column 12, lines 24 and 26, "band" should read -- baud --.

Claim 27, column 12, line 29, "band" should read -- baud --.

Signed and Sealed this

Second Day of August 1983

[SEAL]

Attest:

GERALD J. MOSSINGHOFF

*Attesting Officer*   *Commissioner of Patents and Trademarks*